US006386743B1

(12) United States Patent
Futami et al.

(10) Patent No.: US 6,386,743 B1

(45) Date of Patent: May 14, 2002

(54) PROJECTION-TYPE LIGHT

(75) Inventors: Takashi Futami, Tokyo; Teruo Koike, Kanagawa, both of (JP)

(73) Assignee: Stanley Electric Corporation, Tokyo (JP)

(*) Notice: Subject to any disclaimer, the term of this patent is extended or adjusted under 35 U.S.C. 154(b) by 0 days.

(21) Appl. No.: 09/457,589

(22) Filed: Dec. 9, 1999

(30) Foreign Application Priority Data

Dec. 10, 1998 (JP) .......................................... 10-351622

(51) Int. Cl.[7] ................................................ B60Q 1/02

(52) U.S. Cl. ....................... 362/516; 362/517; 362/518; 362/516; 362/521; 362/348; 362/308; 362/309

(58) Field of Search ................................ 362/308, 309, 362/297, 521, 522, 538, 348

(56) References Cited

U.S. PATENT DOCUMENTS

| | | | | | |
|---|---|---|---|---|---|
| 1,814,326 | A | * | 7/1931 | Melton | 362/302 |
| 4,953,063 | A | * | 8/1990 | Nino | 362/539 |
| 6,007,223 | A | * | 12/1999 | Futami | 362/517 |
| 6,109,772 | A | * | 8/2000 | Futami et al. | 362/517 |

FOREIGN PATENT DOCUMENTS

| | | |
|---|---|---|
| JP | 3-64962 | 10/1991 |
| JP | 7-78503 | 3/1995 |
| JP | 7-245003 | 9/1995 |
| JP | 9-219104 | 8/1997 |

* cited by examiner

*Primary Examiner*—Sandra O'Shea
*Assistant Examiner*—Anabel Ton
(74) *Attorney, Agent, or Firm*—Morgan, Lewis & Bockius LLP

(57) ABSTRACT

A projection-type vehicle light includes a light source, a front lens that includes a plurality of aspherical lenses, and a reflector unit for directing reflected light rays incident to a corresponding aspherical lens. A plurality of elipse group reflector units can be used having a common first focus located round the light source, and a plurality of second foci respectively positioned between a focus of a corresponding aspherical lens and a front of the corresponding aspherical lens. The projection-type vehicle light provides a unique appearance with superior transparency of the front lens and a three dimensional feeling when viewed. The projection-type vehicle light also has a high efficiency of light rays reflected by a reflecting surface incident to an aspherical lens, and provides horizontally wide and highly uniform light distribution patterns.

43 Claims, 10 Drawing Sheets

PROJECTION-TYPE LIGHT

This invention claims the benefit of Japanese Patent Application No. 10-351622, filed on Dec. 10, 1998, which is hereby incorporated by reference.

BACKGROUND OF THE INVENTION

1. Field of the Invention

The invention relates to configurations for a projection light used for illumination or signaling functions, and more particularly to configurations for vehicle lights such as a headlight, fog light, tail light, turn signal light, or traffic light for roadways and railroads. The projection light is generally circular in a front view and can include a light source, an ellipse group reflecting surface and a thick front lens. The projection light distribution is basically determined by the principles of the projection of a focused images. The projection light includes the following light ray path: light rays are emitted from the light source and reflected by the reflector, focused to at least one point, then projected to travel through the thick circular front lens. The ellipse group reflecting surface is defined by a reflecting surface that has a cross-section formed as an ellipse or similar shape such as a rotated parabolic surface, a complex elliptic surface, or an elliptical free-curved surface.

2. Discussion of the Related Art

FIGS. 15–17 illustrate configurations of conventional lights that can be used as a vehicle or traffic light. A conventional vehicle light 90 shown in FIG. 15 includes a light source 91, a rotated parabolic surface reflector 92 having a focus on the light source 91, and a front lens 93 having prismatic cuts 93*a* on its inner surface.

Light emitted from the light source 91 is reflected by the rotated parabolic surface reflector 92 to form parallel light rays. The reflected light is then diffused by the prismatic cuts 93*a* when passing through the front lens 93, thereby providing a predetermined light distribution.

FIG. 16 illustrates a horizontal cross sectional assembled view of another conventional vehicle light 80. The conventional vehicle light 80 includes a light source 81, a complex reflecting surface 82, and a front lens 83 that has no prismatic cuts. The complex reflecting surface 82 can be parabolic with a focus located at the light source 81 in a vertical cross sectional assembled view, and configured as a complex paraboloidal solid surface composed of connected straight lines in a horizontal cross sectional assembled view. Light distribution patterns for the light 80 are formed by adjusting the complex reflecting surface 82.

FIG. 17 illustrates a conventional projection-type vehicle light 70 including a light source 71, an aspherical lens 73, an elliptical reflecting surface 72 having a first focus on the light source 71 and a second focus at which light reflected from the elliptical reflecting surface 72 converges. The focused image of light rays is enlarged and projected to the aspherical lens 73. The light rays are refracted by the aspherical lens 73 to create specific light distribution patterns for the projection-type vehicle light 70.

A shade 74 may be used to prohibit unnecessary light rays, e.g., high beam type light rays, from passing through the aspherical lens 73. The shade 74 includes a top portion located around the second focus of the elliptical reflecting surface 72.

Improvements to multi projection lens type projection lights are also disclosed in Japanese Patent Publication No. HEI 03-64962.

The conventional vehicle and traffic lights described above have the following problems. The vehicle light 90 in FIG. 15 does not have a substantially transparent front lens 93 and therefore cannot provide a three dimensional feeling. These features are becoming important requirements in the market. The prismatic cuts 93*a* must have optical function, requiring deep straight line cuts or curved line cuts having great curvature. Accordingly, the lens 93 is relatively thick, and the transparency of the lens 93 is deteriorated.

The vehicle light 80 in FIG. 16 has superior transparency because the lens 83 does not have any prismatic cuts. However, it is difficult to adjust the complex reflecting surface 82 and therefore is also difficult to obtain a sufficiently wide light distribution pattern. The light distribution patterns of the vehicle light 80 are determined by adjusting the entire combined complex reflecting surface 82. Adjustment cannot be easily achieved by manipulation of discrete portions of the complex reflecting surface 82.

The projecting-type vehicle light 70 in FIG. 17 is very long and deep and is difficult to design and/or place into a vehicle body. In addition, the external diameter of the aspherical lens 73 is small, and thus the light emitting area of the projection-type vehicle light 70 is small. When the projection-type vehicle light 70 is used as a headlight, visibility of a vehicle incorporating the projection-type vehicle light 70 is reduced as viewed from another vehicle traveling in an oncoming lane.

The vehicle lights 70, 80, 90 are commonly used in the market but lack design uniqueness and do not provide a novel appearance. Furthermore, none of the vehicle lights 70, 80, 90 provides sufficient efficiency when the depth of the light is reduced because efficiency of lumen output of a light source depends on the depth of the vehicle light.

The vehicle lamp disclosed in Japanese Patent Publication No. HEI 03-64962 has the following problems. Since optical axes of the respective aspherical lenses are aligned in different directions from each other, light distribution patterns of the vehicle lamp are formed by a combination of the light distributions from the aspherical lenses. Therefore, there is a tendency for the connecting lines of respective light distribution patterns for each aspherical lens to clearly appear in the light distribution pattern of the vehicle lamp. The light distribution patterns of this projection-type vehicle light is often thought of as not thoroughly uniform. Furthermore, utilization efficiency of reflected light by the elliptical reflecting surface is small. The second focus of the elliptical reflecting surface and the focus of aspherical lens is a common point. The radius of curvature of the aspherical lens is not the same as the radius of curvature of the ellipse. The aspherical lens is not located in a position in which the imaginary hemispherical portion which is a mirror of the elliptical reflecting surface is located. Therefore, a considerable amount of the light rays that are reflected by the elliptical reflecting surface are not incident to the aspherical lens, especially light rays that are reflected by the substantially lower half portion of the elliptical reflecting surface. Although the elliptical reflecting surface extends towards the aspherical lens without changing the diameter of the aspherical lens 4, the amount of light incident on the aspherical lens 73 does not substantially improve. Light rays reflected by the extended reflecting portion are not incident to the aspherical lens 73 because the focus of the aspherical lens 73 is a point. Additionally, light rays reflected by the lower half portion of the reflector from the light source are not incident to the aspherical lens 73 if the optical axes of the reflector and the aspherical lens are parallel to each other, because the light rays reflected by the lower half portion become upwardly directed light rays which are not necessary for the formation of the passing-by low beam light distribution pattern. To obtain a larger amount of light, the overall size of the projection-type vehicle light must be enlarged.

SUMMARY OF THE INVENTION

The invention is directed to a projection-type vehicle headlight or traffic light that substantially obviates one or more of the above problems due to the limitations and disadvantages of the related art.

An object of the invention is to provide a projection-type vehicle light that has a novel appearance with superior transparency of he front lens and which provides a three dimensional aspect to a viewer.

Another object of the invention is to provide a projection-type vehicle light that has sufficient light emitting area and is capable of providing wide and highly uniform light distribution patterns, especially in the horizontal plane.

Still another object of the invention is to provide a projection light with high incident efficiency of light rays reflected by a reflecting surface to an aspherical lens.

The above objects can be achieved by providing a projection-type vehicle light including a light source positioned in a reflector, a front lens including a plurality of aspherical lenses and a reflector including at least one reflector unit or combination thereof for directing reflected light rays such that they are incident to a corresponding aspherical lens. The reflector unit can include the following:

1. A plurality of ellipse group reflector units having a common first focus around the light source and a plurality of second foci respectively positioned between a focus of a corresponding aspherical lens and a front end of the corresponding aspherical lens;
2. A plurality of ellipse group reflector units having a common first focus on the light source, and a second focus which is a curved line intersecting a respective focus of a corresponding aspherical lenses;
3. An ellipse group reflector unit including an upper reflecting surface and a lower reflecting surface divided along a horizontal central line of a corresponding aspherical lens, and wherein the upper reflecting surface has a first focus at a front end of the light source and the lower reflecting surface has a first focus at a back end of the light source; and
4. An ellipse group reflector unit including a plurality of reflecting surface segments divided from a vertical central line of a corresponding aspherical lens toward both right and left ends in predetermined intervals, wherein each reflecting surface segment has a common first focus around the light source, and wherein second foci of reflecting surface segments form a curved line connecting respective foci of the corresponding aspherical lenses in a horizontal cross sectional view, and each second focus is positioned above the horizontal center line of the corresponding aspherical lens in a vertical cross sectional view.

In accordance with an aspect of the invention, the light can include a light source, a lens located adjacent the light source and including a plurality of aspherical lenses each having an aspherical focus, and a reflector located adjacent the light source, wherein the reflector includes a plurality of ellipse group reflector units having a common first focus located substantially at the light source and each reflector unit having a second focus respectively located substantially between an aspherical focus of a corresponding aspherical lens and a front portion of the aspherical lens.

In accordance with another aspect of the invention, the light can include a light source, a lens including a plurality of aspherical lenses each having an aspherical focus, and a reflector including a plurality of ellipse group reflector units having a common first focus located substantially at the light source and each reflector unit having a second focus forming a curved line and located substantially at a respective aspherical focus of a corresponding aspherical lens.

In accordance with another aspect of the invention, the light can include a light source, a lens including a plurality of aspherical lenses each having an aspherical focus, and a reflector including an ellipse group reflector unit that has an upper reflecting surface and a lower reflecting surface divided along a horizontal central line, wherein the upper reflecting surface has an upper focus and the lower reflecting surface has a lower focus positioned at a different location from the upper focus.

In accordance with another aspect of the invention, the light can include a light source, a lens including a plurality of aspherical lenses each having an aspherical focus, and a reflector including an ellipse group reflector unit having a plurality of reflecting surface segments, the reflecting surface segments having a common first focus located substantially at the light source and each of the reflecting surface segments having a second focus forming a curved line and located substantially at a respective aspherical focus of a corresponding aspherical lens as viewed in a horizontal cross sectional view, and each second focus being positioned above a horizontal center line of a corresponding aspherical lens as viewed in a vertical cross sectional view.

In accordance with another aspect of the invention, the light can include a light source, a lens including a plurality of aspherical lenses each having an aspherical focus, and a reflector having an upper half portion and a lower half portion, the upper half portion including a rotated elliptical surface with a first upper focus located substantially at the light source and a second upper focus located substantially at an aspherical focus of a corresponding aspherical lens, the lower half portion having a rotated parabolic surface with a first lower focus located substantially at said light source.

Additional objects and advantages of the invention will be set forth in part in the description which follows, and in part will be obvious from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF PREFERRED EMBODIMENTS

Figure 1:
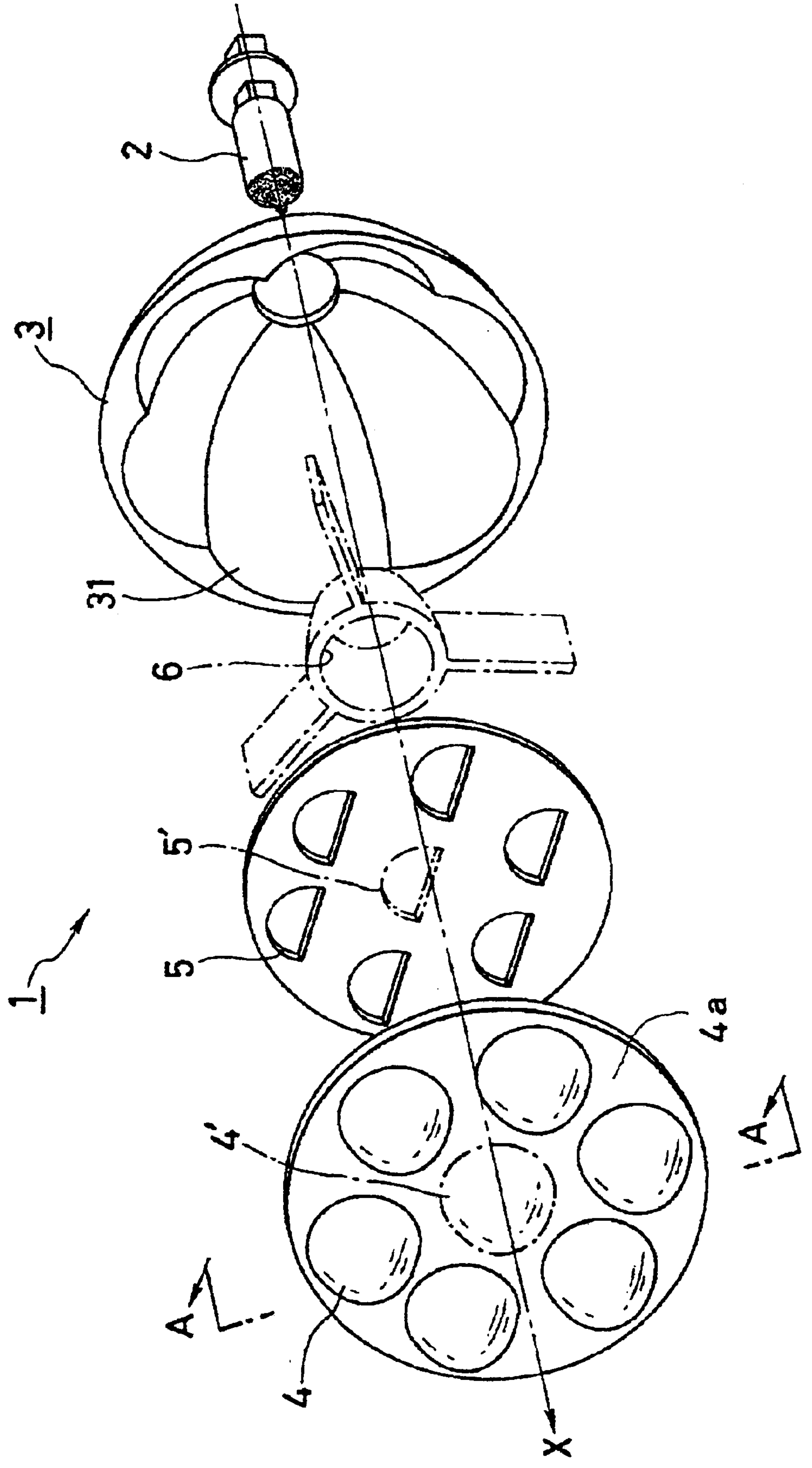
FIG. 1 illustrates an exploded perspective view of a preferred embodiment of the projection-type light invention.

Reference will now be made in detail to preferred embodiments of the invention. Whenever possible, the same reference numbers will be used throughout the drawings to refer to the same or like parts.

FIGS. 1–4 illustrate a preferred embodiment of the invention. The projection-type vehicle light 1 can include a light source 2, a reflector 4 having a plurality of reflector units 31, a front lens including a central aspherical lens 4' and a plurality of aspherical lenses 4 which correspond respectively to the plurality of reflector units 31. A holder portion 4*a* connects respective aspherical lenses 4 and defines a perimeter of the front lens. In this embodiment, the reflector 3 is a combination of six reflector units 31.

Light rays reflected by a reflector unit 31 positioned below a horizontal center line of the reflector 3 can be incident to the particular aspherical lens 4. The amount of light rays reflected above the horizontal center line of the reflector 3 is small as compared to conventional projection-type automobile light 70. If the reflecting unit 31 is extended to the aspherical lens 4 and the diameter of the aspherical lens 4 is unchanged, the additional reflected light rays are directly committed to improve the utilization efficiency of lumen output for the light source 2. The improved efficiency is due to the fact that the focus F4 of the aspherical lens 4 is preferably a curved line focus and radius of curvature of the extended portion is able to be adjusted such that light rays reflected by that portion can be incident to the aspherical lens 4.

The shape of the reflector unit 31 appears to be an elliptical reflecting surface. However, the shape of the reflector unit 31 can actually be a free-curved surface, e.g., an apparently curved surface that comprises a plurality of differently shaped surfaces such a rotated parabolic surfaces, parabolic cylinder surfaces, quadratic curved line surfaces, hyperboloids, planar and other surfaces. Therefore, adjustment of radius of curvature can be achieved with a free-curved surface reflector. Furthermore, efficiency of reflected light rays incident to the aspherical lens 4 is improved to such an extent that it is possible to reduce the depth of the projection-type automobile light in comparison with conventional projection-type automobile light 70.

When the projection-type vehicle light 1 is used for a headlight, or if necessary for any other reason, a shade plate including a central shade 5' and a plurality of surrounding shades 5 may be interposed between the reflector 3 and the front lens for prohibiting unnecessary light rays from the light distribution pattern of the projection-type vehicle light 1. The shade plate can be transparent except for the central shade 5' and the plurality of shades 5.

Furthermore, in order to improve utilization efficiency of lumen output from the light source 2, a central reflector unit 6 having a focus F3 at a predetermined position may be interposed between the reflector 3 and the outer lens such that the central reflector unit 6 works in cooperation with the central shade 5' (if the shades 5 or 5' are necessary) and with the central aspherical lens 4'.

Figure 2:
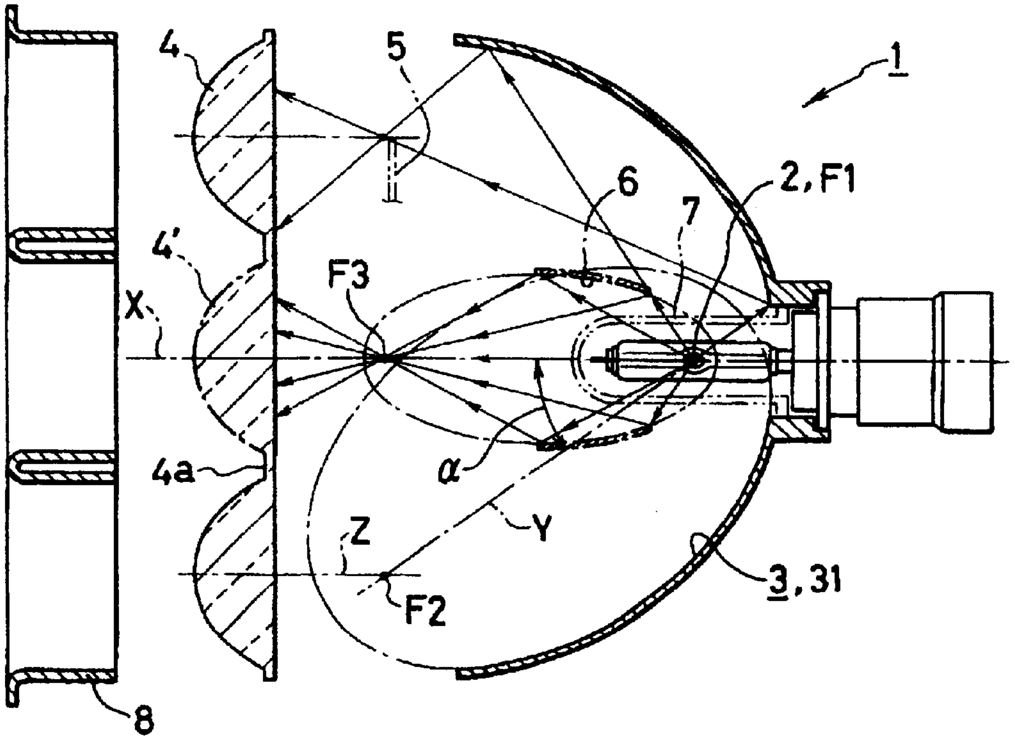
FIG. 2 illustrates a cross sectional view taken along line A—A in FIG. 1.

Optical axes of the aspherical lenses 4 and 4' are parallel to an optical axis X of the projection-type vehicle light 1. The aspherical lenses 4 and 4' are arranged such that the aspherical lenses 4 radiate from the central aspherical lens 4'. Each surrounding aspherical lens 4 is located approximately 10–200 mm outside of the central spherical lens 4' with a focal distance of approximately 10–60 mm. The reflector unit 31 preferably includes an ellipse group reflecting surface which includes elliptical reflectors, rotated parabolic surface reflectors, complex elliptic surface reflectors, free-surface reflectors, etc.. In this embodiment, the reflector unit 31 has a rotated elliptical surface. Each reflector unit 31 has a common first focus F1 around the light source 2, and has a respective second focus F2 on an optical axis Z of a corresponding aspherical lens 4, and typically on the focus of the corresponding aspherical lens 4. As shown in FIG. 2, each reflector unit 31 has an optical axis Y with an angle $\alpha$ of approximately 10–80 with respect to an optical axis X of the projection-type vehicle light 1. The central reflector unit 6 is located such that the central reflector unit 6 does not prohibit light rays from traveling to the reflector unit 31.

Figure 4:
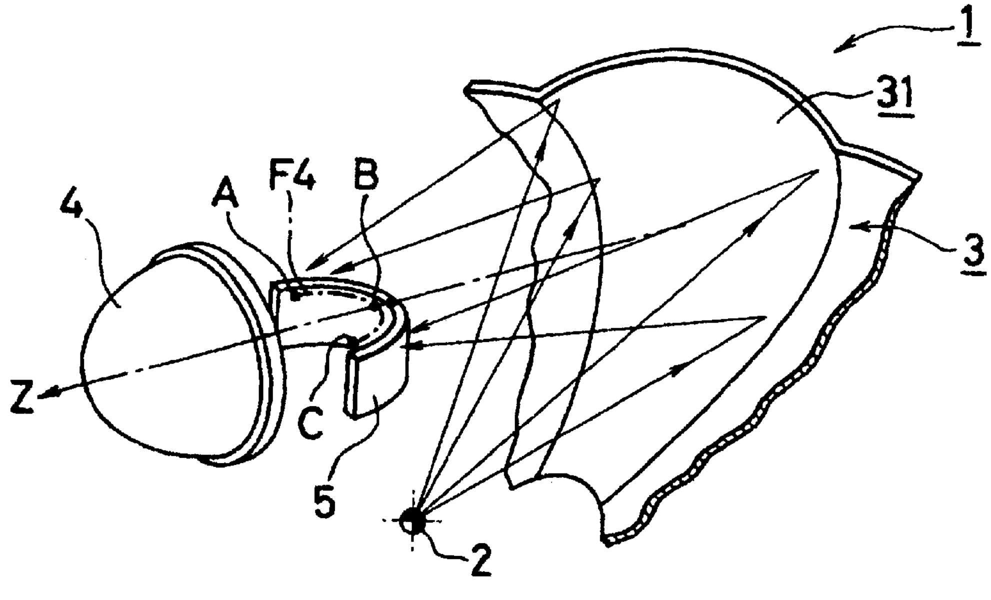
FIG. 4 illustrates a partial perspective view of the preferred embodiment of he invention as shown in FIG. 1.

FIG. 4 illustrates a basic configuration of the reflector unit 31. The curved line A-B-C corresponds to the second focus of the reflector unit 31, and also corresponds to the focus of aspherical lens 4 corresponding to the "curvature of field" which depends on the incident angle of light. Light rays incident parallel to the optical axis Z of the aspherical lens 4 focus to a center point B of the curved line A-B-C. As light rays are incident at a larger angle relative to the optical axis Z of the aspherical lens 4, the light rays focus at a point closer to the aspherical lens 4 than point B. The focus of the aspherical lens 4 moves from B to A or B to C, depending on incident angle and position of light rays relative to the optical axis Z of the aspherical lens 4.

In the projection-type vehicle light 1, the second focus F2 of the reflector unit 31 is located at the curved line A-B-C which corresponds to the movement of the location of the focus F4 of the aspherical lens 4 which depends on reflecting position of light rays on the reflector unit 31. Light rays reflected on the right side in the front view of the reflector unit 31 focus around point C of the curved line A-B-C. Light rays reflected around the center of the reflector unit 31 focus around point B. And light rays reflected on the left side in the front view of the reflector unit 31 focus around point A. The shades 5 and a central shade 5', if necessary, may be curved along the curved line A-B-C, i.e., the second focus of the reflector unit 31 which is also the focus F4 of the aspherical lens 4. An upper end of the shade 5 or 5' lies along the curved line A-B-C.

In the projection-type vehicle light 1, superior efficiency of lumen output from the light source 2 is achieved. With respect to light passage in the projection-type vehicle light 1 along the vertical cross section, as shown in FIG. 2, the location of the optical axes Y and Z of the reflecting unit 31 and the aspherical lens 4, respectively, differ from each other. The optical axes Z of the aspherical lenses 4 and 4' are parallel to the optical axis X of the projection-type vehicle light 1. Accordingly, the optical axes Z of the aspherical lenses 4 that surround the central aspherical lens 4' are positioned substantially at an inward location at an angle relative to the optical axes Y of the reflector unit 31. Therefore, light rays reflected by the portion of the reflector unit 31 farthest from a particular aspherical lens 4 can be incident to the particular aspherical lenses 4. If the reflecting unit 31 is extended to the aspherical lens 4 and the diameter of the aspherical lens 4 is unchanged, the additional reflecting area directly improves utilization efficiency of lumen output of the light source 2.

With respect to light passage in the projection-type vehicle light 1 in a horizontal cross section, reflected light rays focus around a respective second focus on a curved line A-B-C and then travel toward a center of the corresponding aspherical lens 4 and cross each other in the vicinity of the corresponding aspherical lens 4. This section is due to the second focus A-B-C of the reflector unit 31 being designed to correspond to movement of the focus F4 of the aspherical lens 4 which corresponds to the angle of light incident to the aspherical lens 4. Accordingly, a larger amount of light incident to the aspherical lens 4 is obtained.

The front lens of the projection-type vehicle light 1 can include a plurality of aspherical lenses 4. Since each aspherical lens 4 is configured to provide light passage as described above, the projection-type vehicle light 1 achieves improved utilization efficiency of lumen output from the light source 2 as compared with a projection-type vehicle light having a single aspherical lens 4.

Light distribution patterns of the projection-type vehicle light 1 have superior uniformity of luminous density distribution In addition, the boundaries formed between light distribution patterns, which are formed of light emitted from respective aspherical lenses 4, are not conspicuous. Since optical axes Z of respective aspherical lenses 4 are parallel to the optical axis X of the projection-type vehicle light 1, the light distribution pattern of the projection-type vehicle light 1 is a combination of a plurality of patterns formed by substantially identical light distribution pattern elements. Therefore, it is relatively easy to adjust the design parameters for forming light distribution patterns, especially as compared to the conventional projection-type vehicle light as disclosed in Japanese Patent Publication No. HEI 03-64962.

The shade 5 is used to place the light in "low beam" mode, prohibiting unnecessary light rays and facilitating passing by another vehicle. In the projection-type vehicle light 1, the shade 5 or 5' is disposed such that it prohibits light rays from reflecting upwards and thus places the light 1 in "low beam" mode. Since the reflector unit 31 in the upper half portion of the reflector 3 does not reflect light rays upward, the shade 5 or 5' may be disposed only for the aspherical lenses 4 in a lower half portion of the front lens. However, it is also preferable to arrange the shade 5 for the aspherical lenses 4 in an upper half portion of the front lens in order to prohibit upward light rays that are reflected by the deepest portion of the reflector 3. In the alternative, the shade 5 or 5' may be disposed for respective aspherical lenses 4 or 4' as shown in FIG. 1. However, even if the shade 5 or 5' is not used, light distribution patterns with acceptable quality levels are obtained and the amount of light utilized from the light source 2 can be greatly improved.

Since light from the light source 2 is emitted through the plurality of aspherical lenses 4 and 4', the amount of light which passes through each aspherical lines 4 is reduced as compared with the conventional projection-type vehicle light 70 which has an outer lens formed as a single aspherical lens 73. However, the plurality of aspherical lens 4 and 4' and holder portion 4*a* can be formed from resin molding as a single unit without creating problems due to heat resistivity.

The aspherical lens 4 and 4' may be colored to comply with color requirements of the projection-type vehicle light 1 depending on its usage. An alternative way to vary light color for the projection-type vehicle light 1 includes providing a colored cap 7 disposed over the light source 2 as shown in FIG. 2.

The projection-type vehicle light 1 may further include an extension 8 which covers the outer lens except for the aspherical lenses 4 and 4' as shown in FIG. 2. The perimeter of the extension 8 is designed to fit to a vehicle body. The extension 8 can have the same color as the vehicle body, or may be coated to have a metallic shine. The color or metallic shine of the extension 8 can be reflected in the aspherical lens 4, which improves the aesthetic appearance of the projection-type vehicle light 1.

Figure 5:
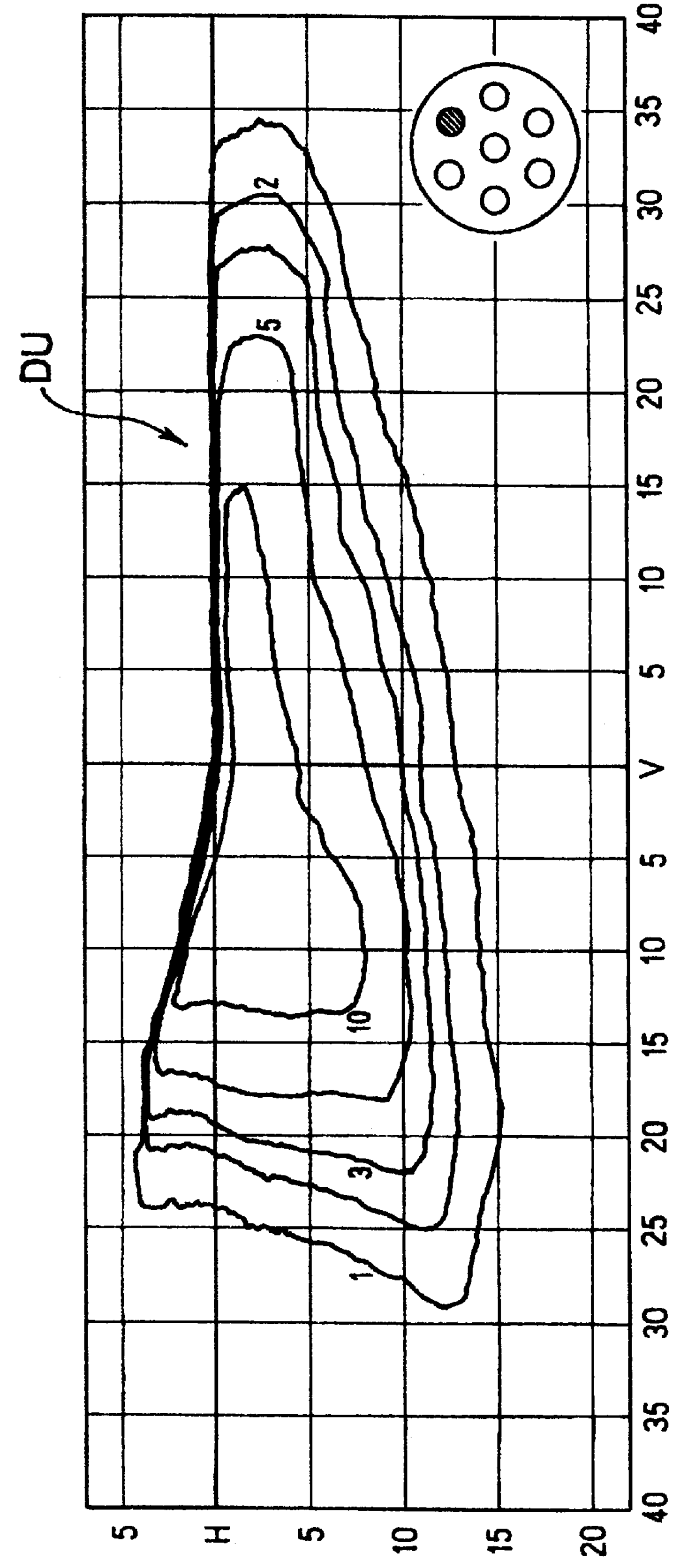
FIG. 5 is a graph showing light distribution characteristics for a projection-type vehicle light according to the preferred embodiment of the invention shown in FIG. 1 as viewed from an aspherical lens located at an upper right portion of the projection-type vehicle light.

FIG. 5 illustrates a light distribution pattern DU obtained from a single aspherical lens 4 located in the upper right portion of the outer lens as viewed from the front of the projection-type vehicle light 1 (the location of the aspherical lens 4 is illustrated at the right lower corner of the graph shown in FIG. 5). A large horizontally oriented light distribution can be obtained by using a free-curved reflecting surface for the reflector unit 31 corresponding to the upper right aspherical lens 4.

Figure 6:
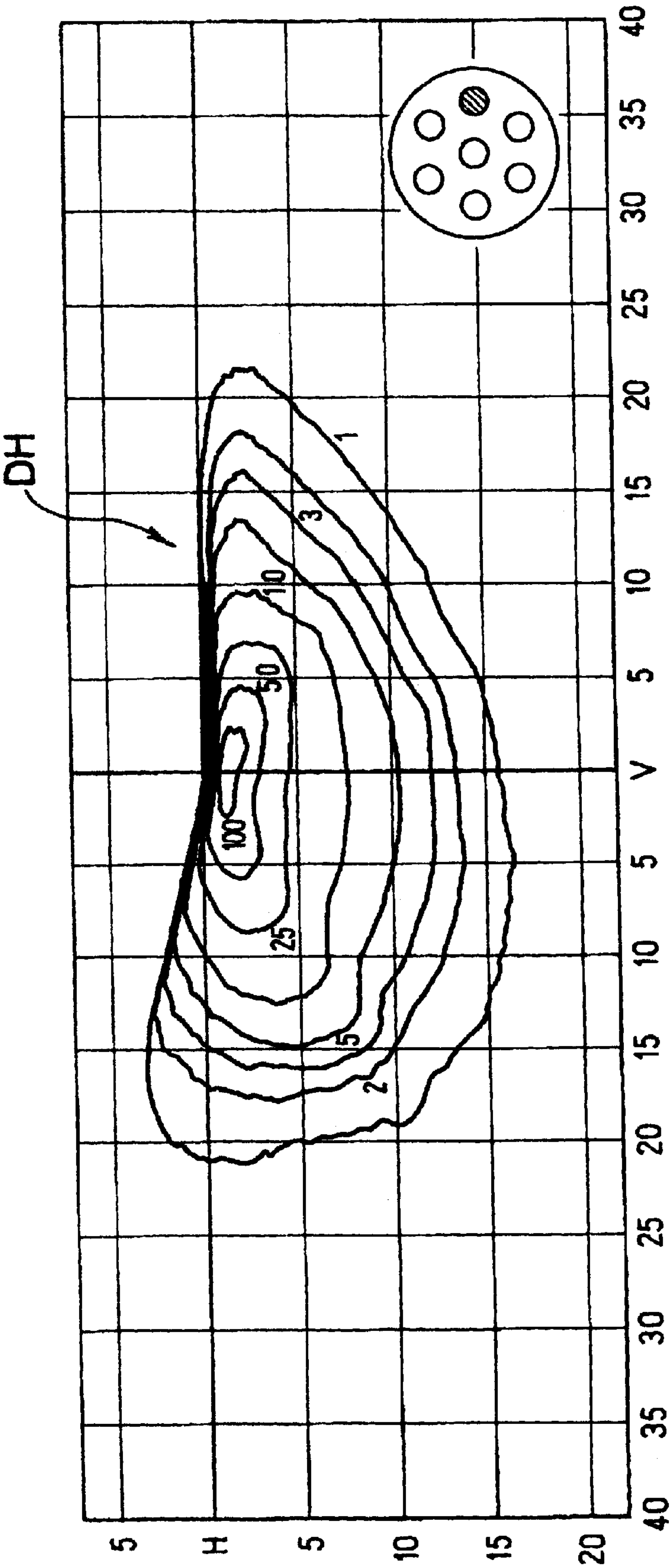
FIG. 6 is a graph showing light distribution characteristics for a projection-type vehicle light according to the preferred embodiment of the invention shown in FIG. 1 as viewed from an aspherical lens located at a central right portion of the projection-type vehicle light.

FIG. 6 illustrates a light distribution pattern DH obtained from a single aspherical lens 4 located in the horizontal right portion of the outer lens as viewed from the front of the projection-type vehicle light 1 (the location of the aspherical lens 4 is illustrated at the right lower corner of the graph shown in FIG. 6). The reflector unit 31 corresponding to the aspherical lens 4 located at the horizontal right side can have a rotated elliptic surface and is designed to have high luminance at a center portion of the light distribution pattern DH.

Figure 7:
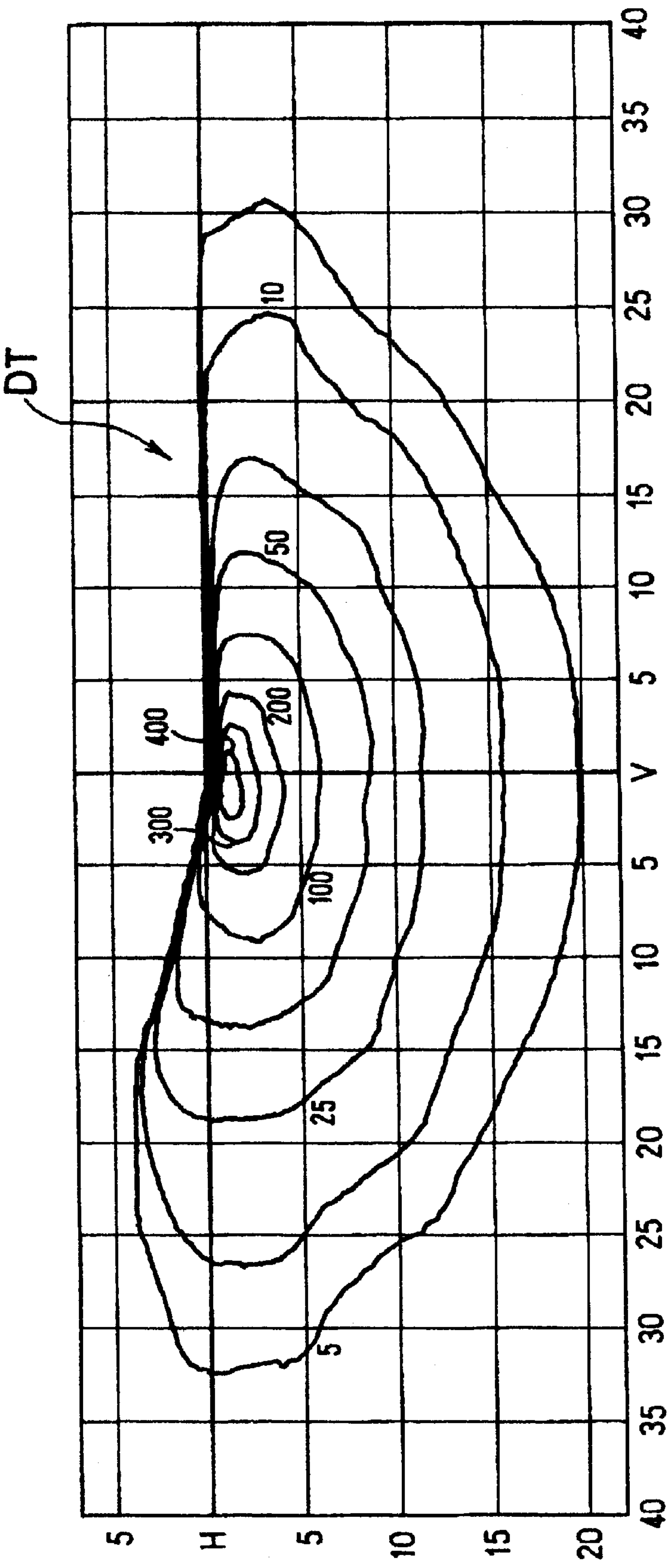
FIG. 7 is a graph showing light distribution characteristics for the entire projection-type vehicle light according to the preferred embodiment of the invention as shown in FIG. 1.

FIG. 7 illustrates a light distribution pattern DT for the projection-type vehicle light 1 which is a combined light distribution pattern for aspherical lenses 4 and 4'. Since the reflector 3 is a combination of a plurality of reflector units 31 having different shapes depending on their assigned position, the light distribution pattern DT has a wide illumination area and high luminance at its center portion.

Figure 8:
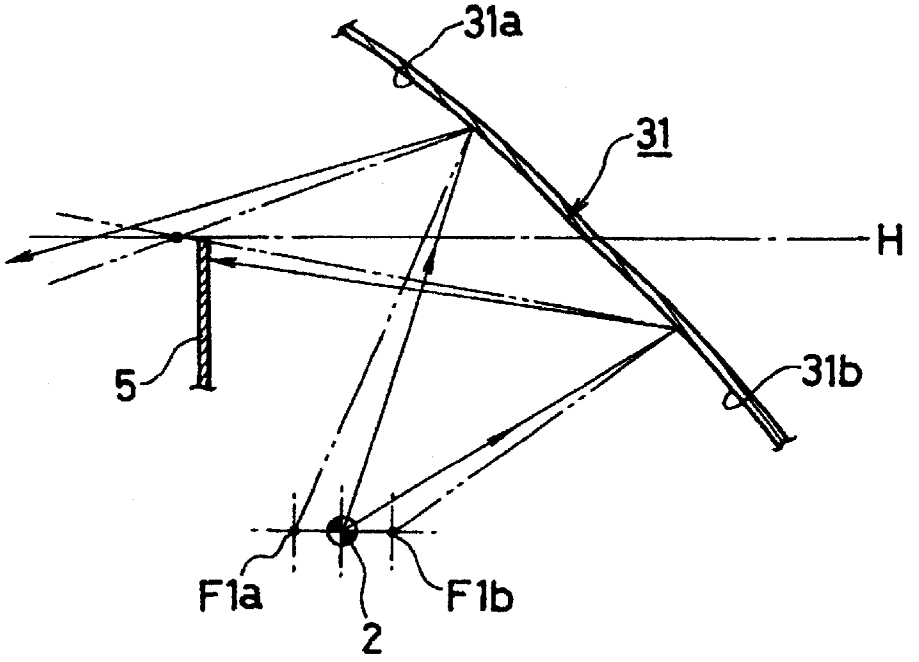
FIG. 8 illustrates a partial cross sectional view of another preferred embodiment of the invention.

FIG. 8 illustrates a partial view of another embodiment of the invention. In this embodiment, each reflector unit 31 is divided by a horizontal surface H passing through a center of its corresponding lens 4 and dividing the reflector unit 31 into an upper reflecting surface 31*a* and a lower reflecting surface 31*b*. The first focus F1*a* of the upper reflecting surface 31*a* is in front of the light source 2. The first focus F1*b* of the lower reflecting surface 31*b* is in the rear of the light source 2. The upper reflecting surface 31*a* reflects light rays from the light source 2 downward to make an image of the light source 2 above the horizontal surface H. The lower reflecting surface 31*b* reflects light rays from the light source 2 upward to make an image of the light source 2 below the horizontal surface H. Therefore, shade 5 is able to more effectively prohibit only upward light rays when the light is in its "low beam" or "passing-by" light distribution pattern. The light distribution pattern obtained by the preferred embodiments of FIG. 8 has great efficiency of light emitted from the light source 2 and superior quality while reducing upwardly reflected light rays.

Figure 9:
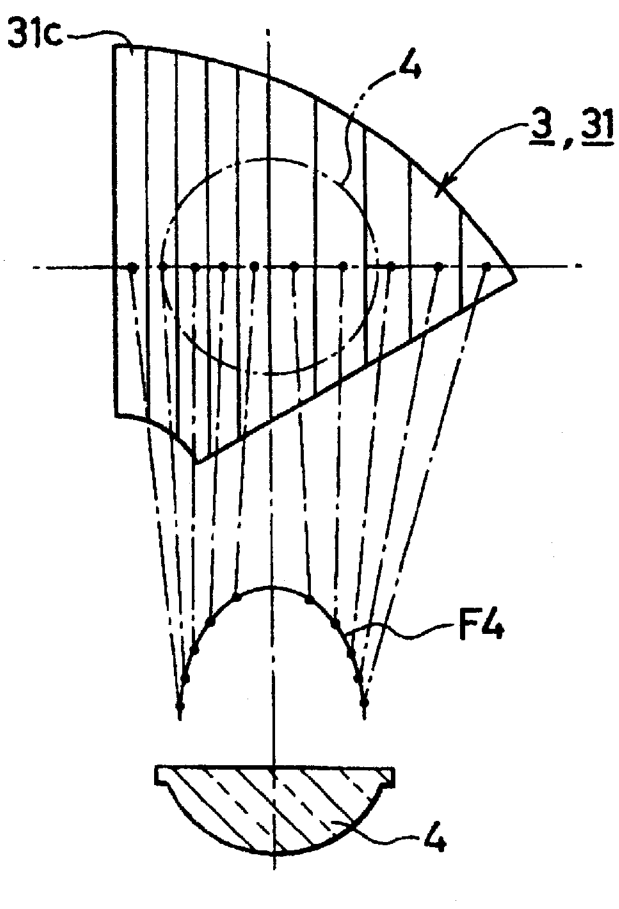
FIG. 9 illustrates a partial cross sectional view of another preferred embodiment of the invention.

FIG. 9 illustrates a partial front and top view of another preferred embodiment of the invention. In the embodiment, each reflector unit 31 is divided into a plurality of segments 31*c* along vertical lines. Each segment 31*c* has a second focus whose position is consistent with a corresponding focus of the aspherical lens 4. For example, a segment 31 located on a right end as viewed from the front of the reflector unit 31 has a second focus on a right end of the curved line focus F4 of the aspherical lens 4. Additionally, similar to the preferred embodiment of FIG. 8, each segment 31*c* is designed to have a second focus that creates an image of the light source 2 above a horizontal surface H passing through the center of the corresponding aspherical lens 4. Since the reflector unit 31 is divided into segments 31, determination of the position of the second focus of the reflector unit 31 is made easier. Thus, the product can be made with greater ease and accuracy.

Figure 10:
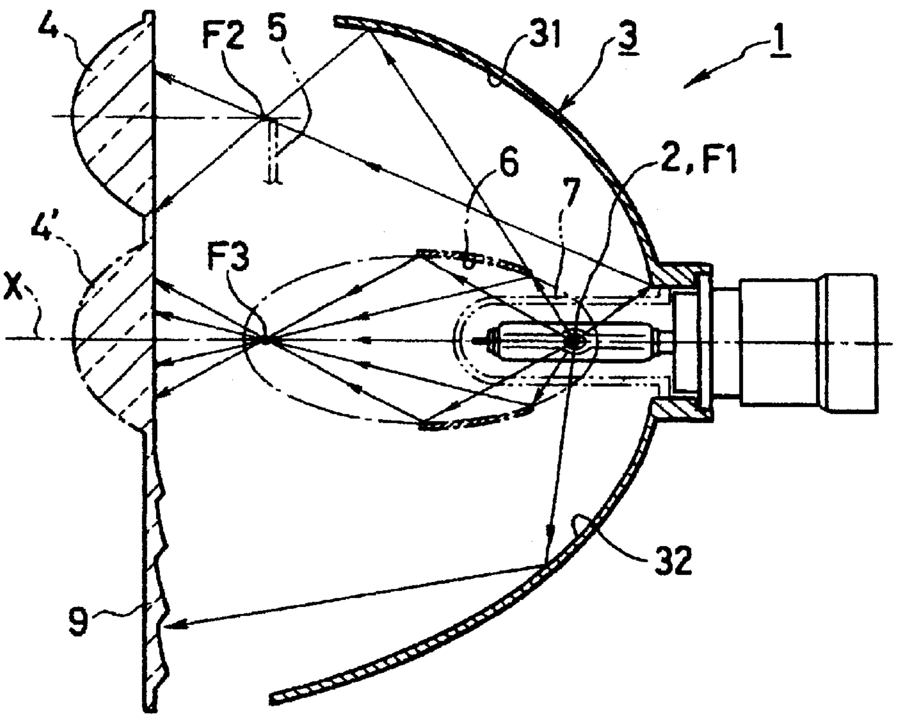
FIG. 10 illustrates a partial cross sectional view of another preferred embodiment of the invention.

FIG. 10 illustrates another preferred embodiment of the invention. In a projection-type vehicle light 1, the reflecting surface located above an optical axis Z of an aspherical lens 4 generally has a tendency to reflect light rays downward and the reflecting surface located below an optical axis Z of the aspherical lens 4 generally has a tendency to reflect light rays upward. When the projection-type vehicle light 1 is used only to from "low-beam" light distribution patterns for passing by other automobiles, a reflector unit 31 can be located below the optical axis X of the projection-type vehicle light and include a rotated parabolic surface 32 which substantially reflects light rays downward. An outer lens portion located adjacent to the rotated parabolic surface 32 may be a flat lens portion 9 with prismatic cuts.

Figure 11:
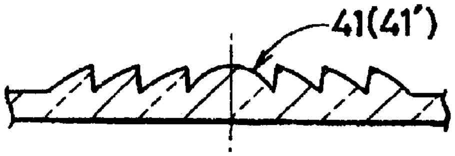
FIG. 11 illustrates a partial cross sectional view of another preferred embodiment of the aspherical lens of the invention.
Figure 12:
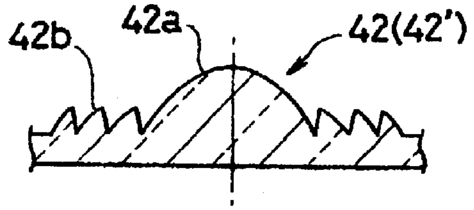
FIG. 12 illustrates a partial cross sectional view of another preferred embodiment of the aspherical lens of the invention.
Figure 13:
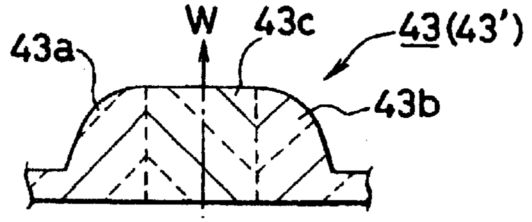
FIG. 13 illustrates a partial cross sectional view of another preferred embodiment of the aspherical lens of the invention.

FIGS. 11–13 illustrate partial views of preferred embodiments of the lenses of the invention. The aspherical lenses 4 or 4' are not limited to convex lenses. Instead of convex lenses, a Fresnel lens 41 (41') as shown in FIG. 11 may be used. A transformed aspherical lens 42 including a center convex lens portion 42*a* and a surrounding Fresnel lens portion 42*b* is also acceptable as a substitute for the aspherical lens 4 or 4'. The Fresnel lens 41 (41') and the transformed aspherical lens 42(42') provide unique design characteristics. The Fresnel lens 41 (41') and the transformed aspherical lens 42(42') can also provide an aesthetic appearance similar to crystal glass by adjusting the pitch of the Fresnel cuts. Furthermore, since the projection lens is relatively flat when Fresnel lens 41(41') is used, the possibility of unfavorable deformation of the outer lens during resin molding production is reduced.

Figure 3:
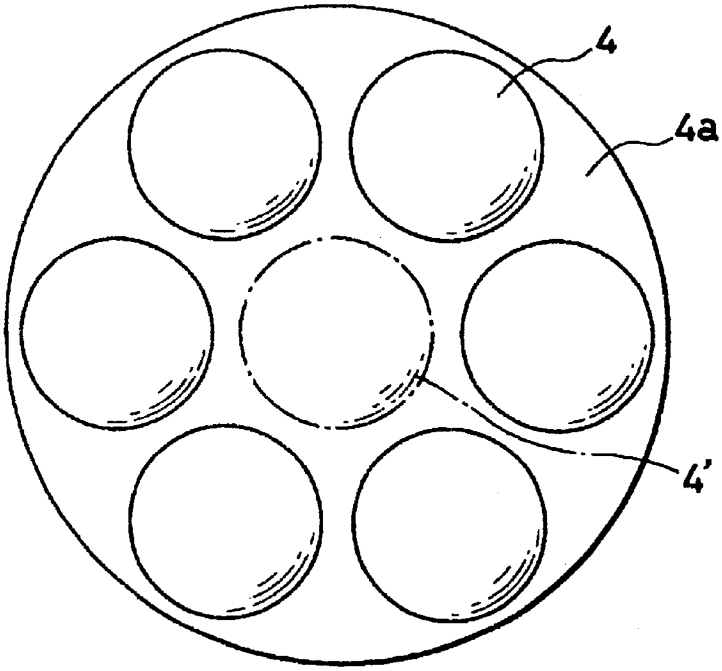
FIG. 3 illustrates a front view of the preferred embodiment of the invention as shown in FIG. 1.

FIG. 13 illustrates another transformed aspherical lens 43 (43') that includes a cylindrical lens portion 43*c* and half lens portions 43*a*, 43*b* respectively attached to either side of the cylindrical lens portion 43*c*. The half lens portions 43*a* and 43*b* can be configured as a half of the aspherical lens 4 or 4' as shown in the embodiment of FIG. 3 divided along its central axis. Luminous flux that includes light rays reflected by the rotated elliptical surface reflector unit 31 are circular in a vertical cross sectional view. When the light rays pass through the cylindrical lens portion 43*c*, the luminous flux is enlarged towards both the right and left sides along the central axis W of the cylindrical lens portion 43. A wide light distribution pattern in the horizontal plane can be obtained by locating the transformed aspherical lens 43 such that the central axis W of the cylindrical lens portion 43*c* is horizontal.

Figure 14:
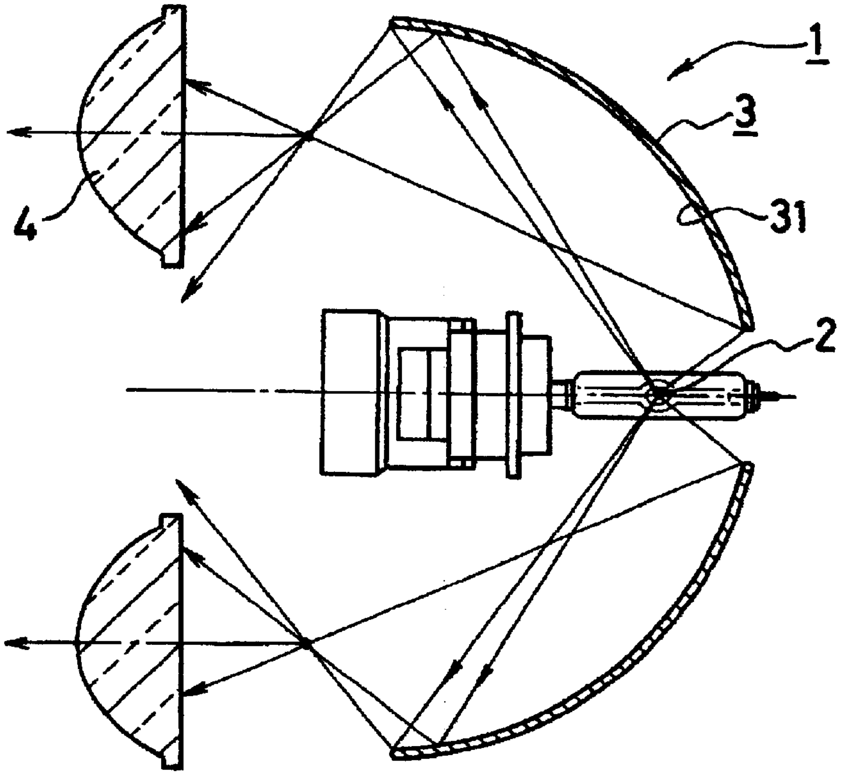
FIG. 14 illustrates a partial cross sectional view of another preferred embodiment of the invention.
Figure 15:
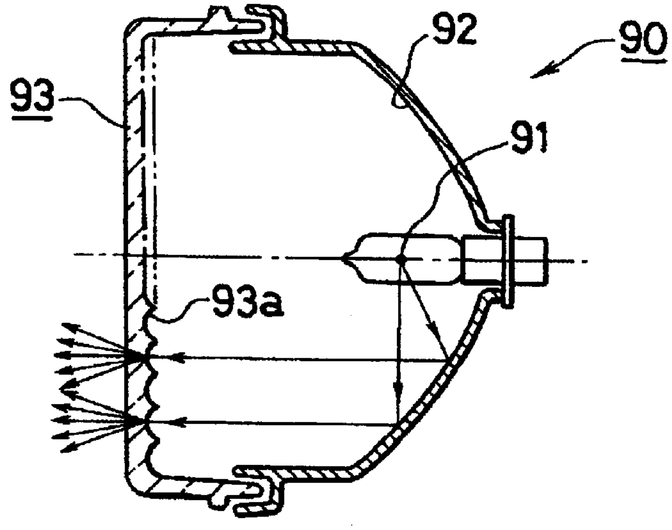
Fig. 15 Prior Art
FIG. 15 illustrates a cross sectional view of a conventional vehicle light.
Figure 16:
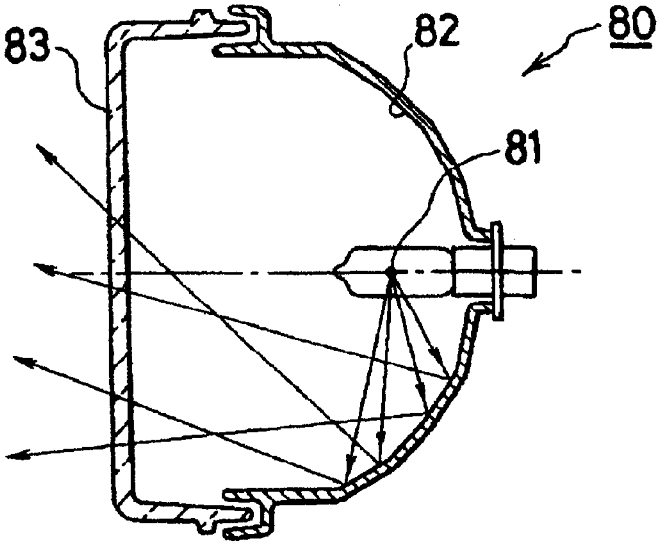
Fig. 16 Prior Art
FIG. 16 illustrates a cross sectional view of another conventional vehicle light.
Figure 17:
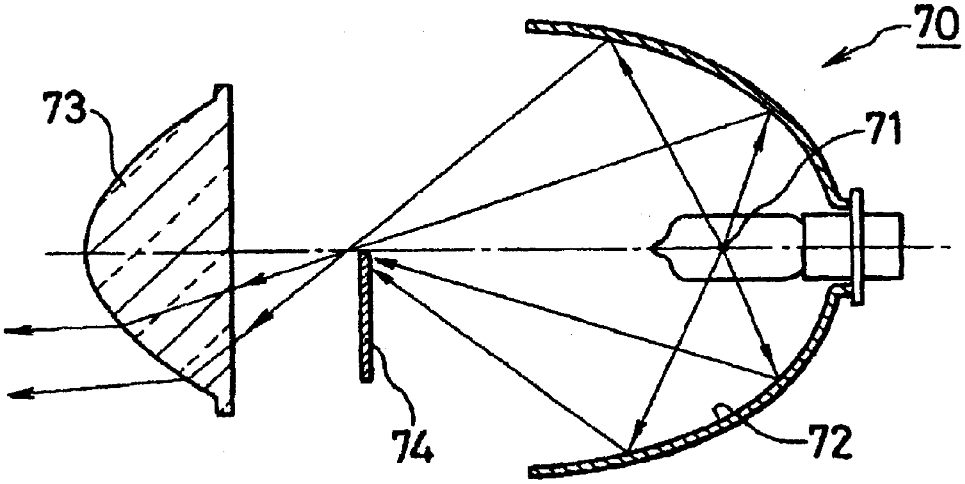
Fig. 17 Prior Art
FIG. 17 illustrates a cross sectional view of still another conventional vehicle light.

FIG. 14 illustrates another preferred embodiment of the invention. The embodiment of FIG. 14 reduces the overall depth of the projection-type vehicle light 1 without substantially and unfavorably effecting the light distribution of the projection-type vehicle light 1. The reflector unit 31 can be a rotated elliptic surface 31 with small curvature and can include a relatively large aperture at a central portion of the reflector. The socket portion of the light source 2 preferably faces away from the elliptic surface. Accordingly, the top of the light source 2 can face the corresponding reflector unit 31. In the embodiment of FIG. 14, the light source 2 is attached from a front side of the projection-type vehicle light 1 such that neither the central aspherical lens 4' nor the central reflector unit 6 are necessary.

The operational advantages of the projection-type vehicle light according to the preferred embodiments of the invention will now be described. Since the front lens of the projection-type vehicle light includes a plurality of aspherical lenses, the projection-type vehicle light is able to be designed with great flexibility in appearance, both when the projection-type vehicle light is lit and when it is off. This design flexibility and uniqueness emphasizes differences from conventional projection-type vehicle lights, and captures attention in the market. Additionally, the outer lens which includes the aspherical lenses and the holder portion connecting the respective aspherical lenses 4 determines the perimeter of the outer lens and also provides a unique appearance for the projection-type vehicle light. A wide variety of appearances can be obtained by slightly changing the outer lens design. For example, the holder portion can be transparent, allowing the appearance from the outside of the projection-type vehicle light to include a mixture of enlarged and actual-size images of the interior of the light. The images from the aspherical lenses are enlarged, while the images from the holder portion are actual size. Furthermore, if the lens holder portion is opaque and the shade has a color matching the vehicle body color, the projection-type vehicle light 1 can have different colors depending on whether the light is lit or is off. Additionally, if the outer lens includes Fresnel cuts that each have a small pitch, the projection-type vehicle light can have an appearance similar to crystal glass.

From the view point of performance, since the reflector is a combination of reflector units each having an ellipse group reflecting surface whose optical axes Y are positioned as an outward location relative to the optical axis X of the projection type vehicle light, the reflector can be relatively shallow and the projection-type vehicle light can be made thinner than conventional lights. This configuration for the reflector reduces the required space for the light in a vehicle body. Furthermore, since light emitted from a single light source is distributed to a plurality of aspherical lens, each aspherical lens has a lower operating temperature than a conventional light. Thus, the outer lens 4*a* can be formed of plastic resin, which leads to great production cost reduction for the projection-type vehicle light 1. Additionally, substantially all light emitted from the light source can be utilized for the formation of the light distribution pattern of the vehicle light 1 by using a central reflecting unit. Therefore, luminance of the projection-type vehicle light is improved. The light emitting area of the projection-type vehicle light 1 can also be enlarged by the plurality of aspherical lenses. Therefore, visibility from a vehicle in the oncoming lane is improved.

It will be apparent to those skilled in the art that various changes and modifications can be made herein without departing from the spirit and scope of the invention. For example, the light source 2 can be a high intensity discharge light source, an LED light, an incandescent light, a halogen light, as well as other types of lights. The light source can also be located and arranged is various positions within the light 1, including facing sideways, or backwards as shown in 14. The invention also contemplates the use of different numbers of aspherical lenses and reflector portions for the light 1. Thus, it is intended that the invention cover the modifications and variations of this invention provided they come within the scope of the appended claims and their equivalents.

What is claimed is:

1. A light, comprising:

a light source;

a lens located adjacent said light source and including a plurality of aspherical lenses each having an aspherical focus; and a reflector located adjacent said light source, wherein said reflector includes a plurality of ellipse group reflector units having a common first focus located substantially at said light source and each reflector unit having a second focus respectively located substantially between an aspherical focus of a corresponding aspherical lens and a front portion of said aspherical lens.

2. The light according to claim 1, wherein said reflector units include a reflector optical axis and said aspherical lenses include an aspherical lens optical axis, and said reflector optical axis is not parallel to said aspherical lens optical axis.

3. The light according to claim 1, wherein the light includes a light optical axis and said aspherical lenses include an aspherical lens optical axis that is parallel to said light optical axis.

4. The light according to claim 1, further comprising:

a central reflector unit located between said reflector and said lens.

5. The light according to claim 1, further comprising:

a shade located between said reflector and said lens such that an upper portion of said shade is located substantially at a second focus of a corresponding reflector unit.

6. The light according to claim 1, wherein said lens includes a colored holder portion and said aspherical lenses are transparent.

7. The light according to claim 1, wherein said lens is formed by resin molding.

8. The light according to claim 1, further comprising:

an extension having a transparent portion and a colored portion and located adjacent said lens.

9. The light according to claim 1, wherein said aspherical lenses are a combination of a convex lens and a Fresnel lens.

10. The light according to claim 1, wherein said aspherical lenses are a combination of a cylindrical lens and a pair of aspherical lenses that are divided in half and located at either side of said cylindrical lens.

11. The light according to claim 1, wherein said light is a projection-type vehicle light.

12. The light according to claim 1, wherein said lens includes holder portion that maintains the relative position between said aspherical lenses.

13. The light according to claim 4, wherein said lens includes a central aspherical lens and said central reflector is located adjacent said central aspherical lens.

14. A light, comprising:

a light source;

a lens including a plurality of aspherical lenses each having an aspherical focus; and a reflector including a plurality of ellipse group reflector units having a common first focus located substantially at said light source and each reflector unit having a second focus forming a curved line and located substantially at a respective aspherical focus of corresponding aspherical lens.

15. The light according to claim 14, wherein said ellipse group reflector units include a reflector optical axis and said aspherical lenses include an aspherical lens optical axis, and said reflector optical axis is not parallel to said aspherical lens optical axis.

16. The light according to claim 14, wherein the light includes a light optical axis and said aspherical lenses include an aspherical lens optical axis that is parallel to said light optical axis.

17. The light according to claim 14, wherein said lens is formed by resin molding.

18. The light according to claim 14, wherein said aspherical lenses are a combination of a convex lens and a Fresnel lens.

19. The light according to claim 14, wherein said aspherical lenses are a combination of a cylindrical lens and a pair of aspherical lenses that are divided in half and located at either side of the cylindrical lens.

20. The light according to claim 14, wherein said light is a projection-type vehicle light.

21. A light, comprising:

a light source;

a lens including a plurality of aspherical lenses each having an aspherical focus; and a reflector including an ellipse group reflector unit that has an upper reflecting surface and a lower reflecting surface divided along a horizontal central line, wherein said upper reflecting surface ha an upper focus and said lower reflecting surface has a lower focus positioned at a different location from said upper focus.

22. The light according to claim 21, wherein said ellipse group of reflector unit includes a reflector optical axis and said aspherical lenses include an aspherical lens optical axis, and said reflector optical axis is not parallel to said aspherical lens optical axis.

23. The light according to claim 21, wherein the light includes a light optical axis and said aspherical lenses include an aspherical lens optical axis that is parallel to said light optical axis.

24. The light according to claim 21, wherein said lens is formed by resin molding.

25. The light according to claim 21, wherein said aspherical lenses are a combination of a convex lens and a Fresnel lens.

26. The light according to claim 21, wherein said aspherical lenses are a combination of a cylindrical lens and a pair of aspherical lenses that are divided in half an located at either side of the cylindrical lens.

27. The light according to claim 21, wherein said light is a projection-type vehicle light.

28. The light according to claim 21, wherein said horizontal central line is defined by a plane including a central axis of a corresponding aspherical lens.

29. The light according to claim 21, wherein said upper focus is located in front of said light source and said lower focus is located in back of said light source.

30. A light, comprising:

a light source;

a lens including a plurality of aspherical lenses each having an aspherical focus; and a reflector including an ellipse group reflector unit having a plurality of reflecting surface segments, said reflecting surface segments having a common first focus located substantially at said light source and each of said reflecting surface segments having a second focus forming a curved line and located substantially at a respective aspherical focus of a corresponding aspherical lens as viewed in a horizontal cross sectional view, and each second focus being positioned above a horizontal center line of a corresponding aspherical lens as viewed in a vertical cross sectional view.

31. The light according to claim 30, wherein said ellipse group reflector unit includes a reflector optical axis and said aspherical lenses include an aspherical lens optical axis, and said reflector optical axis is not parallel to said aspherical lens optical axis.

32. The light according to claim 30, wherein the light includes a light optical axis and said aspherical lenses include an aspherical lens optical axis that is parallel to said light optical axis.

33. The light according to claim 30, wherein said lens is formed by resin molding.

34. The light according to claim 30, wherein said aspherical lenses are a combination of a convex lens and a Fresnel lens.

35. The light according to claim 30, wherein said aspherical lenses are a combination of a cylindrical lens and a pair of aspherical lenses that are divided in half and located at either side of said cylindrical lens.

36. The light according to claim 30, wherein said light is a projection-type vehicle light.

37. A light, comprising:

a light source;

a lens including a plurality of aspherical lenses each having an aspherical focus; and a reflector having an upper half portion and a lower half portion, said upper half portion including a rotated elliptical surface with a first upper focus located substantially at said light source and a second upper focus located substantially at an aspherical focus of a corresponding aspherical lens, said lower half portion having a rotated parabolic surface with a first lower focus located substantially at said light source.

38. The light according to claim 37, wherein the light includes a light optical axis and said aspherical lenses include an aspherical lens optical axis that is parallel to said light optical axis.

39. The light according to claim 37, wherein said lens is formed by resin molding.

40. The light according to claim 37, wherein said aspherical lenses are a combination of a convex lens and a Fresnel lens.

41. The light according to claim 37, wherein said aspherical lenses are a combination of a cylindrical lens and a pair of aspherical lenses that are divided in half and located at either side of the cylindrical lens.

42. The light according to claim 37, wherein said light is a projection-type vehicle light.

43. The light according to claim 37, wherein said lower half portion includes a second lower focus located substantially at an aspherical focus of a corresponding aspherical lens, and said lower half portion of said lens includes a substantially flat surface with prismatic cuts.

* * * * *